Oct. 10, 1961
J. H. DE LACY
3,003,405
CAMERA SHUTTER
Original Filed Nov. 12, 1954
3 Sheets-Sheet 1
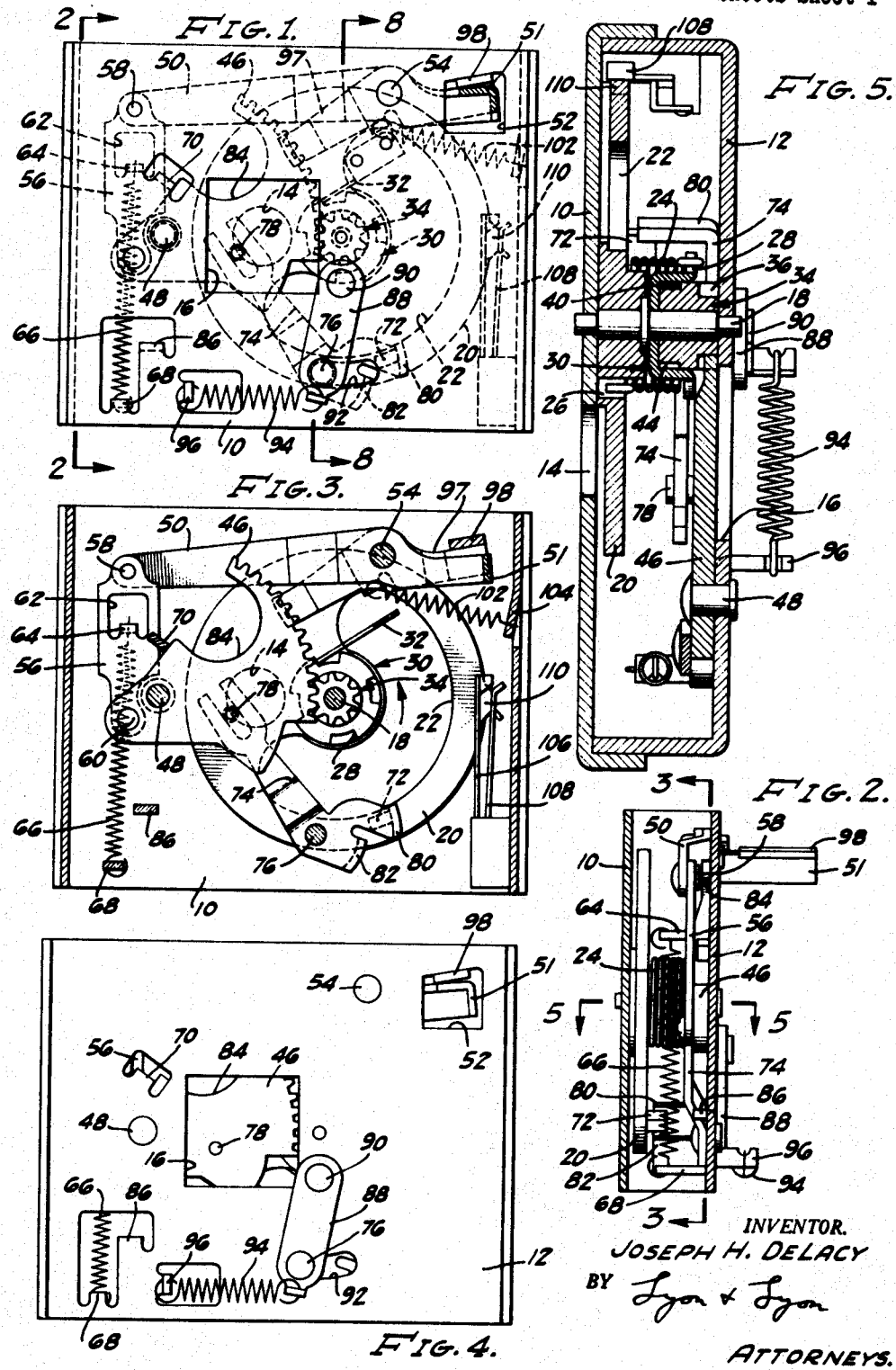
INVENTOR.
JOSEPH H. DELACY
BY Lyon & Lyon
ATTORNEYS.

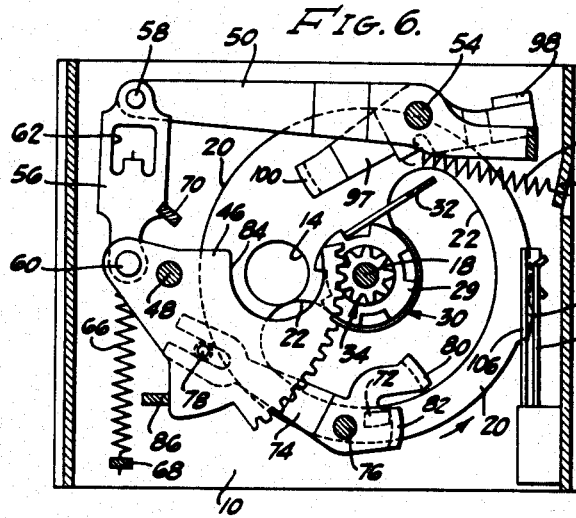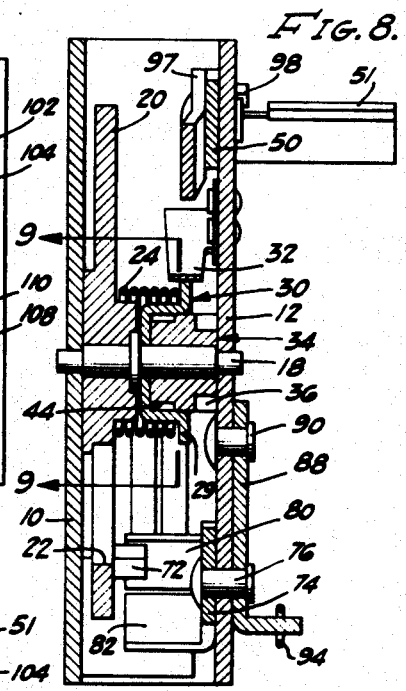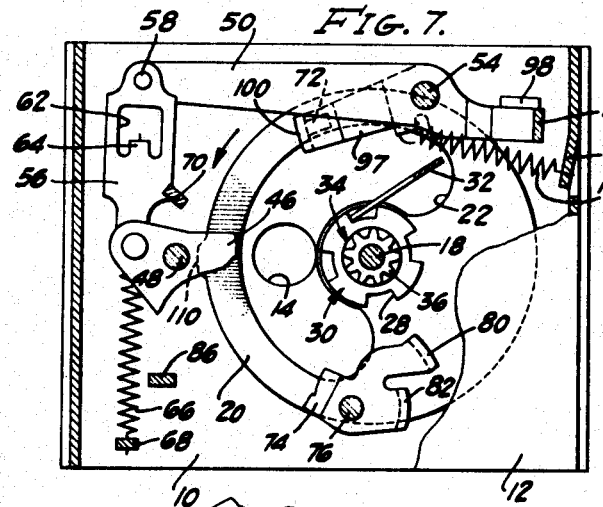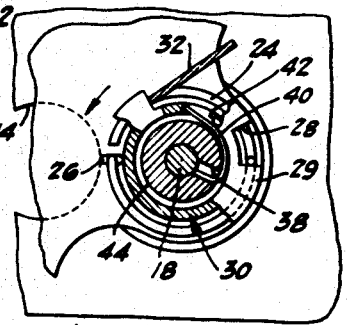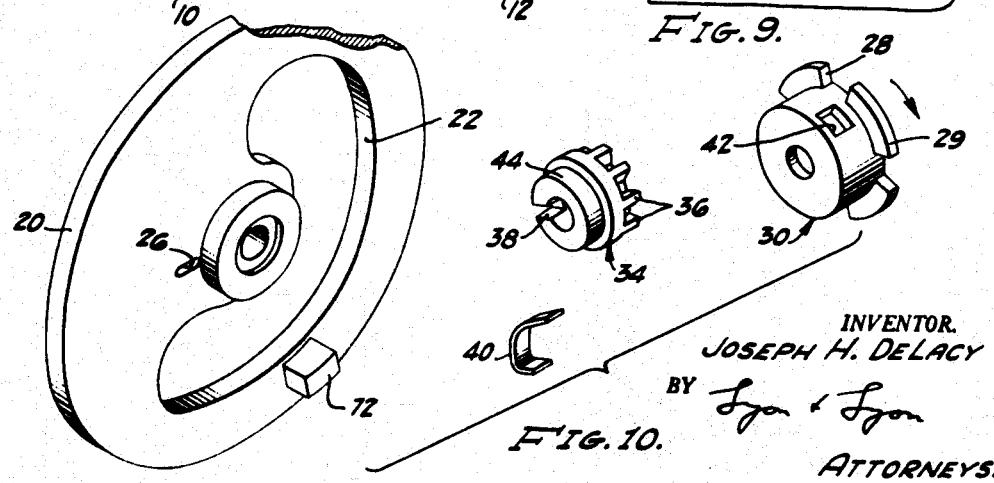

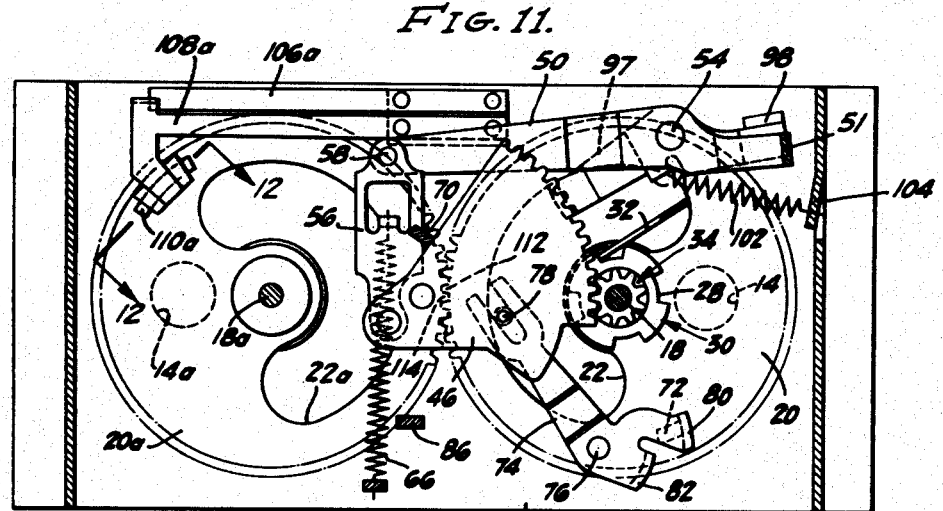

United States Patent Office 3,003,405
Patented Oct. 10, 1961

3,003,405
CAMERA SHUTTER
Joseph H. De Lacy, Los Angeles, Calif.
(1785 Monrovia Ave., Costa Mesa, Calif.)
Original application Nov. 12, 1954, Ser. No. 468,379, now Patent No. 2,870,697, dated Jan. 27, 1959. Divided and this application July 21, 1958, Ser. No. 750,038
3 Claims. (Cl. 95—18)

This invention relates to a camera shutter.

This application is a divisional application of my application Serial No. 468,379, filed November 12, 1954, now Patent No. 2,870,697, issued January 27, 1959.

It is an object of this invention to provide a shutter mechanism for relatively inexpensive single exposure and stereo cameras.

It is a further object of this invention to provide a shutter mechanism using a freely rotating blade.

It is a further object of this invention to provide a shutter mechanism having a relatively large angular arc of opening.

It is a further object of this invention to provide a shutter mechanism of increased efficiency.

It is still a further object of this invention to provide a shutter mechanism having a uniform velocity of the shutter blade and having a long accuracy life.

Still a further object of this invention is to provide a shutter mechanism wherein the blade velocity is more easily adjusted upon assembly.

Other objects and advantages will be readily apparent from the following description.

In the drawings:

FIGURE 1 is a front plan view of the shutter mechanism with parts thereof in phantom.

FIGURE 2 is a section taken along line 2—2 of FIGURE 1.

FIGURE 3 is a section taken along line 3—3 of FIGURE 2.

FIGURE 4 is a view similar to FIGURE 1 with the phantom parts omitted.

FIGURE 5 is a section taken along line 5—5 of FIGURE 2.

FIGURE 6 is a view similar to FIGURE 3 immediately after release of the shutter blade.

FIGURE 7 is a view similar to FIGURE 6 illustrating operation of the time lever.

FIGURE 8 is a section taken along line 8—8 of FIGURE 1.

FIGURE 9 is a section taken along line 9—9 of FIGURE 8.

FIGURE 10 is a disassembled perspective of the shutter blade and associated parts.

FIGURE 11 is a view similar to FIGURE 3 of a modified form of this invention.

FIGURE 12 is a section taken along line 12—12 of FIGURE 11.

FIGURE 13 is a front plan view of a further modification.

FIGURE 14 is a section taken along line 14—14 of FIGURE 13.

FIGURE 15 is a section taken along line 15—15 of FIGURE 14.

The shutter mechanism is contained between a chassis plate 10 and base plate 12, each of which has a flanged periphery, the flanged periphery of the base plate fitting within the flanged periphery of the chassis plate 10. The base plate has an aperture 16 which is optically aligned with the camera lens and with aperture 14 in chassis plate 10. A shaft 18 is mounted between the two plates and rotatably supports adjacent the chassis plate a shutter blade 20 having an exposure slot 22 therein so that when the slot swings past the aperture 14, an exposure is made.

The shutter blade 20 is rotated by the shutter blade spring 24 which has one extremity thereof engaging the shutter blade 20 in slot 26. The other end of the spring 24 engages one of the slots 28 in a peripheral flange 29 on the shutter spring cup 30 which is rotatably mounted upon shaft 18.

The shutter spring cup 30 is permitted to turn in one direction only, that is, counterclockwise as viewed from the chassis plate 10, by the cup pawl 32. The pawl 32 is mounted upon base plate 12 and is inclined to enter one of the slots 28. When the shutter spring cup is rotated counterclockwise as viewed from the chassis plate 10, the pawl 32, which is a leaf spring, slips out of one of the slots 28 and into the next. If, however, the shutter cup attempts to reverse its direction of rotation, it is prevented by the pawl.

Fitting within the shutter spring cup 30 is a pinion 34 which has a plurality of gear teeth 36 thereon. The pinion is slotted as at 38 to receive a bent extremity of pinion dog 40, the other extremity of which enters slot 42 of the shutter spring cup and engages same. Upon rotation of pinion 34 counterclockwise as viewed from the chassis plate 10, the shutter spring cup is likewise driven counterclockwise.

When the pinion 34 is driven in the opposite direction, the dog 40 leaves slot 42. For this reason the diameter of the pinion 34 is reduced at 44 to permit the extremity of dog 40 to flex down against the pinion and permit relative movement between the pinion 34 and the cup 30.

A sector gear 46 is provided with peripheral teeth which mesh with pinion 34 and is pivotally mounted upon base plate 12 by a pin 48. The pivoting of sector gear 46 is controlled by the instantaneous exposure lever 50. This lever has an extremity 51 bent at right angles to the body of the lever which projects through a suitable window 52 in base plate 12. The lever is pivotally mounted upon pin 54 mounted in base plate 12 and has its other end pivotally secured to link 56 by pin 58. The other end of link 56 is pivotally secured to gear sector 46 by pin 60.

Link 56 has an opening 62 therein with a portion 64 projecting outwardly forming an anchor for spring 66. The other extremity of the spring is secured to a projection 68 formed on base plate 12. The spring exerts a downward force upon link 56, resulting in counterclockwise (in FIGURE 1) rotation of sector gear 46 until it strikes upper stop 70 formed in plate 12. When the exposure lever extremity 51 is either manually, or by a suitable plunger in the camera, depressed, an upward force is exerted upon link 56 which pivots gear sector 46 clockwise in FIGURE 1. This drives pinion 34 counterclockwise, which winds up spring 24, which spring is preferably maintained under a pre-load, which may readily be adjusted by movement of the end of the spring 24 to any of the slots 28 in the shutter spring cup 30.

This force applied to spring 24 would normally rotate shutter blade 20 counterclockwise as would the pre-loading of spring 24. To control rotation of the shutter blade 20, a blade lug 72 is formed upon shutter blade 20 which engages the escapement lever 74. The escapement lever 74 is pivotally mounted upon pin 76 which is mounted in base plate 12. The lever has a forked extremity which receives pin 78 of gear sector 46 so that pivoting of the gear sector is transmitted to the escapement lever. At the opposite extremity the escapement lever has two pallets 80 and 82. The pallet 80 is further from pin 76 and higher than pallet 82. When the gear sector engages upper stop 70, the pallet 80 is in the path of and engages lug 72 preventing rotation of the shutter blade. When the gear sector is pivoted upon upward movement of link 56, the escapement lever pivots counterclockwise in FIGURE 1, raising pallet 80 above lug 72, permitting rotation of the shutter blade 20, after the spring 24 has been fully wound up.

When the exposure slot 22 opposes aperture 14 an exposure is made. The gear sector may be cut away as at 84 to avoid interference. After the slot 22 has passed aperture 14 and the exposure is completed, the rotation of the shutter blade is terminated.

The escapement lever has pivoted to the position wherein pallet 82 is in the path of lug 72 as best seen in FIGURE 6. At this point the gear sector 46 is in engagement with lower stop 86 formed in plate 12 in the same manner as is upper stop 70.

When the exposure lever 50 is released, spring 66 exerts a downward force on link 56, rotating the gear sector to the upper or cocked position of FIGURE 1. This pivots the escapement lever clockwise in FIGURE 6 so that pallet 82 releases lug 72 as pallet 80 moves into its path, permitting the shutter blade 20 to rotate a little distance further, to its original starting position.

In this manner the shutter blade moves only in one direction, permitting, among other advantages, use of a larger angular arc of opening. Depression of the exposure lever 50 rotates the gear sector 46 which drives pinion 34, which in turn drives cup 30 by means of the pinion dog 40. This rotation of the cup winds up spring 24 in addition to the pre-load upon the spring. When the cup 30 has made one full turn, the cup pawl 32 enters a slot 28 in the cup and prevents its turning backwards. At this time the escapement lever has pivoted enough so pallet 80 releases lug 72 allowing the shutter blade 20 to rotate until lug 72 engages pallet 82 which has pivoted into its path.

When the exposure lever is released, the gear sector 46 is rotated in the opposite direction by spring 66 to the original position. This rotation of the gear sector 46 is transmitted to pinion 34 but this rotation is not transmitted to shutter cup 30 by the slipping of pinion dog 40 as described above.

Means are also provided to absorb the shock of impact when lug 72 strikes pallet 82. To this end a damper lever 88 is pivotally mounted by pin 90 to plate 12. The lever receives pin 76 which supports escapement lever 74. The plate 12 is slotted as at 92 to permit movement of the pin 76 relative to the plate. A damper spring 94 has one end attached to the damper lever and the other to a suitable projection 96 formed on plate 12. Thus when the lug 72 strikes pallet 82, the pin 76 and escapement lever 74 are permitted to move slightly so that spring 94 absorbs the shock and dampens any tendency of shutter blade 20 to oscillate.

A time exposure lever 97 is also provided, pivoted also about pin 54 and projecting partially out window 52. This lever has an ear 98 which overlies extremity 51 of the exposure lever and has a pallet 100 on its other extremity to engage lug 72.

When the timing lever is depressed manually or by other suitable means, the ear 98 engages the exposure lever 50 and causes same to function in the usual manner after the lever 97 itself has pivoted relative to the exposure lever 50.

Movement of the two levers causes the shutter blade 20 to rotate as when the instantaneous exposure lever was depressed. However, the pallet 100 on the extremity of the time exposure lever engages lug 72 with slot 22 aligned with aperture 14. When the force on the time exposure lever is relieved, the instantaneous exposure lever 50 is returned to its initial position by spring 66 returning pallet 80 into the path of lug 72. After the pallet 80 is in position, the lug 72 is released by pallet 100 when timing lever spring 102 pivots same with respect to lever 50. The spring has one extremity anchored to time lever 97 and the other to a projection 104 formed in plate 12.

This means of functioning of the time lever 97 permits the time exposure to be utilized but returns the mechanism to the instantaneous position so that the operator can not forget to take the camera off time exposure.

Also provided is a synchronous switch for firing a flash lamp when same is utilized. The switch comprises a pair of switch arms 106 and 108. The shutter blade 20 has a synchronous switch lug 110 on its periphery which engages switch arm 108 when the lug 72 is held by pallet 80. When lug 72 is released and the shutter rotates the lug 110 is revolved beyond arm 108 which is a spring which, upon release, pivots towards arm 106 contacting same, closing the switch and completing the electrical circuit to the flash lamp in which circuit the switch is placed.

Illustrated in FIGURES 11 and 12 is a modification of the shutter adapting same to a stereo camera. The same basic mechanism is utilized and the same numerical designations are given parts corresponding to those in the principal embodiment. In this design the chassis plate 10 is extended and a second shutter blade 20a is rotatably mounted thereupon by pin 18a, a second aperture 14a is provided in the plate 10 optically aligned with the second lens of the stereo camera. The periphery of blade 20 is provided with gear teeth 112 which mesh with gear teeth 114 on the periphery of shutter blade 20a, so that rotation of shutter blade 20 drives shutter blade 20a. The exposure slots 22 and 22a are so positioned on blades 20 and 20a to overlie apertures 14 and 14a the same period of time of rotation of the blades permitting taking of the simultaneous pictures necessary.

The synchronous switch for firing a flash lamp is also somewhat modified. The switch arms 106a and 108 are mounted upon chassis plate 10 above the additional shutter blade 22a which carries a lug 110a on its face engaging the extremity of arm 108a until the blade is rotated maintaining same out of contact with arm 106a. The modification otherwise functions in the same manner as the principal embodiment.

In FIGURES 13, 14 and 15 still a further embodiment is illustrated wherein like parts are given the same numerical designation as the principal embodiment. In this form the chassis plate 10 is replaced by a bracket 114 which supports surface mirrors 116 and 118 as well as supporting shaft 18. As best seen in FIGURE 14, the two light sources are through apertures 120 and 122. The light rays strike mirrors 116 and 118 and are deflected in parallel paths onto the film of a stereo camera. The shutter blade herein designated 124 is altered to eliminate the exposure slot. The blade is provided with opposed flanges 126 and 128 which normally block entry of light through apertures 120 and 122. The shutter mechanism functions in the usual manner except in place of lug 72 a pair of lugs 130 and 132 are provided on opposite ends of a diameter of shutter 124. The escapement lever 74 is provided with pallets 80 and 82 in the usual manner to engage lug 130 or lug 132. The escapement lever is actuated by pin 134 on gear segment 46. Upon rotation of the shutter by depression of instantaneous exposure lever 50 the escapement lever 74 is pivoted by pin 134 raising pallet 80 above lug 132, permitting rotation of the shutter. The pallet 82 is raised into the path of lug 130 permitting 180° rotation of the shutter. The angular distances between flanges 126 and 128 function as the shutter slots permitting simultaneous exposure through apertures 120 and 122. The remainder of the mechanism functions as in the principal embodiment.

While what hereinbefore has been described is the preferred embodiment of this invention, it is readily apparent that alterations and modifications can be resorted to without departing from the scope of this invention and such alterations and modifications are intended to be included with the scope of the appended claims.

I claim:

1. A camera shutter comprising a rotatable shutter blade, spring means for urging rotation of said shutter blade, one-way drive means for applying a predetermined force upon said spring means, an escapement lever normally engaging said shutter blade holding same against rotation under the urging of said spring means, a pivotally mounted instantaneous exposure lever, a gear segment pivoted by depression of said instantaneous exposure lever, a pinion meshing with said gear segment and driving said one-way drive means upon rotation thereof, means carried by said gear segment to move said escapement lever to release said shutter blade upon pivoting of said gear segment, and a pair of light receiving openings directed oppositely with respect to each other, a pair of light transmitting openings disposed adjacent each other and at a 90° angle with respect to said light receiving openings, a pair of mirrors disposed between said light receiving openings and said light transmitting openings, said mirrors being disposed adjacent each other and at 90° angles to each other, whereby light may be transmitted from said light receiving openings against said mirrors and through said light transmitting openings, said shutter blade having a pair of flanges, said flanges normally being disposed between said light receiving openings and said light transmitting openings so as to be in the path of and prevent said passage of light, said flanges being moved temporarily out of said path during the rotation of said shutter blade to temporarily permit the passage of light from said light receiving openings through said light transmitting openings.

2. A camera shutter comprising a rotatable shutter blade, spring means for urging rotation of said shutter blade, one-way drive means for applying a predetermined force upon said spring means, an escapement lever normally engaging said shutter blade holding same against rotation under the urging of said spring means, a pivotally mounted instantaneous exposure lever, a gear segment pivoted by depression of said instantaneous exposure lever, a pinion meshing with said gear segment and driving said one-way drive means upon rotation thereof, means carried by said gear segment to move said escapement lever to release said shutter upon pivoting of said gear segment, and a pair of openings directed oppositely with respect to each other, said shutter blade having a pair of right angular flanges, said flanges normally being disposed so as to be in the path of and prevent the passage of light through said openings, said flanges being moved temporarily out of said path during the rotation of said shutter blade to permit the passage of light through said openings.

3. A camera shutter comprising a shutter blade rotatably mounted on a shaft, a coil spring concentric with and surrounding said shaft, a shutter spring cup rotatably mounted on said shaft concentric with and surrounding said shaft, one end of said coil spring engaging said shutter blade and the other end of said coil spring engaging said shutter spring cup, ratchet means engaging said shutter spring cup to permit rotation thereof only in a direction which increases the tension on said coil spring, a pinion rotatably mounted on said shaft adjacent said shutter spring cup, ratchet means connecting said pinion and shutter spring cup whereby rotation of said pinion causes rotation of said shutter spring cup only in a direction which increases the tension on said coil spring, said coil spring urging the rotation of said shutter blade, an escapement lever normally engaging said shutter blade holding same against rotation under the urging of said coil spring, a pivotally mounted instantaneous exposure lever, a gear segment pivoted by depression of said instantaneous exposure lever, said gear segment meshing with said pinion so that the pivoting of said gear segment rotates said pinion and shutter spring cup to increase the tension on said coil spring, means carried by said gear segment to move said escapement lever to release said shutter blade for rotation after the rotation of said shutter spring cup, said shutter blade being circular and having gear teeth disposed along its entire periphery, and a second circular shutter blade having gear teeth disposed along its entire periphery, the gear teeth of said shutter blades being intermeshed so that said second shutter blade is rotated by said first-named shutter blade in the opposite direction from said first-named shutter blade, said shutter blades being rotatable a single revolution upon the pivoting of said escapement lever.

References Cited in the file of this patent

UNITED STATES PATENTS

| 1,512,785 | Mittasch | Oct. 21, 1924 |
| 2,537,905 | Mihalyi | Jan. 9, 1951 |
| 2,690,105 | Lawson | Sept. 28, 1954 |
| 2,837,986 | Perlin | June 10, 1958 |
| 2,870,697 | De Lacy | Jan. 27, 1959 |

FOREIGN PATENTS

| 508,386 | Great Britain | June 30, 1939 |
| 667,829 | Great Britain | Mar. 5, 1952 |